(12) United States Patent
Hagen (10) Patent No.: US 11,286,772 B2
(45) Date of Patent: Mar. 29, 2022

(54) WELLBORE NETWORK WITH REMOTE DIAGNOSTICS

(71) Applicant: HALLIBURTON ENERGY SERVICES, INC., Houston, TX (US)

(72) Inventor: Trond Hagen, Sandefjord (NO)

(73) Assignee: Halliburton Energy Services, Inc., Houston, TX (US)

( * ) Notice: Subject to any disclaimer, the term of this patent is extended or adjusted under 35 U.S.C. 154(b) by 149 days.

(21) Appl. No.: 16/860,791

(22) Filed: Apr. 28, 2020

(65) Prior Publication Data

US 2020/0408088 A1 Dec. 31, 2020

Related U.S. Application Data

(60) Provisional application No. 62/868,762, filed on Jun. 28, 2019.

(51) Int. Cl.
*E21B 47/12* (2012.01)
*H04L 41/0816* (2022.01)
*H04L 41/14* (2022.01)
*H04B 5/00* (2006.01)

(52) U.S. Cl.
CPC .......... *E21B 47/12* (2013.01); *H04L 41/0816* (2013.01); *H04L 41/14* (2013.01); *H04B 5/0075* (2013.01)

(58) Field of Classification Search
CPC ..... E21B 47/12; H04L 41/0816; H04L 41/14; H04B 5/0075
See application file for complete search history.

(56) References Cited

U.S. PATENT DOCUMENTS

| 3,986,393 A | 10/1976 | Hawley |
| 5,959,547 A | 9/1999 | Tubel et al. |
| 5,960,883 A | 10/1999 | Tubel et al. |

(Continued)

FOREIGN PATENT DOCUMENTS

| CN | 103580104 B | 2/2018 |
| EP | 0493579 B1 | 12/1995 |

(Continued)

OTHER PUBLICATIONS

U.S. Appl. No. 16/457,456, Final Office Action, dated Jul. 27, 2020, 16 pages.

(Continued)

*Primary Examiner* — Duc C Ho
(74) *Attorney, Agent, or Firm* — Kilpatrick Townsend & Stockton LLP (57) ABSTRACT

A downhole network-interface unit provides remote diagnostics and control for a downhole communications network. A network-interface unit may convert native format signals from downhole devices to a signal to be sent to a surface controller. Remote diagnostics of signal anomalies in the downhole network can be provided by the network-interface unit to provide diagnostics information, such as measurements or signal waveforms, to the surface. In some examples, the network-interface unit can also segment the downhole network as needed to maintain network health and integrity. Network segmentation can take place automatically in response to determining an anomalous condition or can be directed from a surface controller.

20 Claims, 5 Drawing Sheets

(56) References Cited

U.S. PATENT DOCUMENTS

| | | | |
|---|---|---|---|
| 5,995,520 A * | 11/1999 | Uchiki | H04L 27/22 |
| | | | 370/204 |
| 6,252,518 B1 | 6/2001 | Laborde | |
| 6,300,750 B1 | 10/2001 | Oglesbee et al. | |
| 6,369,718 B1 | 4/2002 | Mathieu | |
| 7,139,218 B2 | 11/2006 | Hall et al. | |
| 7,525,264 B2 | 4/2009 | Dodge | |
| 7,649,474 B1 | 1/2010 | Gard | |
| 8,330,612 B2 | 12/2012 | O'Neill et al. | |
| 8,330,615 B2 | 12/2012 | Hagen | |
| 8,339,276 B2 | 12/2012 | Mandal et al. | |
| 8,353,336 B2 | 1/2013 | Neuhaus et al. | |
| 8,857,507 B2 | 10/2014 | Freeman | |
| 9,683,438 B2 | 6/2017 | Fanini et al. | |
| 2005/0284663 A1 | 12/2005 | Hall et al. | |
| 2007/0024464 A1* | 2/2007 | Lemenager | G01V 11/002 |
| | | | 340/853.1 |
| 2008/0196887 A1 | 8/2008 | McCoy et al. | |
| 2008/0247273 A1 | 10/2008 | Chemali et al. | |
| 2008/0272932 A1 | 11/2008 | Booker et al. | |
| 2009/0120689 A1* | 5/2009 | Zaeper | E21B 47/12 |
| | | | 175/40 |
| 2010/0117854 A1 | 5/2010 | Hagen | |
| 2012/0268288 A1 | 10/2012 | Cousin et al. | |
| 2013/0106615 A1 | 5/2013 | Prammer | |
| 2013/0206387 A1 | 8/2013 | Deville et al. | |
| 2013/0307700 A1 | 11/2013 | Hassan et al. | |
| 2014/0292530 A1 | 10/2014 | Weerasinghe et al. | |
| 2015/0061390 A1 | 3/2015 | Zhang et al. | |
| 2016/0084076 A1* | 3/2016 | Fanini | H04L 67/12 |
| | | | 340/853.1 |
| 2016/0290117 A1* | 10/2016 | Dykstra | E21B 44/04 |
| 2019/0203588 A1* | 7/2019 | Popp | E21B 47/12 |
| 2020/0301393 A1* | 9/2020 | Livescu | E21B 44/00 |

FOREIGN PATENT DOCUMENTS

| | | |
|---|---|---|
| EP | 1637695 | 3/2006 |
| WO | 2013148510 | 10/2013 |
| WO | 2014127489 A1 | 8/2014 |
| WO | 2016094021 | 6/2016 |

OTHER PUBLICATIONS

U.S. Appl. No. 16/457,718, Notice of Allowance, dated May 7, 2020, 7 pages.

PCT Application No. PCT/US2020/030269, International Search Report and Written Opinion, dated Aug. 3, 2020, 16 pages.

U.S. Appl. No. 16/457,456, "Non-Final Office Action", dated Mar. 5, 2020, 15 pages.

U.S. Appl. No. 16/457,718, "Non-Final Office Action", dated Feb. 21, 2020, 9 pages.

PCT/US2019/039954, "International Search Report and Written Opinion", dated Mar. 27, 2020, 14 pages.

PCT/US2019/039995, "International Search Report and Written Opinion", dated Mar. 31, 2020, 12 pages.

* cited by examiner

WELLBORE NETWORK WITH REMOTE DIAGNOSTICS

CROSS-REFERENCE TO RELATED APPLICATION

This application claims the benefit of U.S. Provisional Patent Application No. 62/868,762 filed on Jun. 28, 2019, titled "DOWNHOLE NETWORK SYSTEM," the disclosure of which is hereby incorporated by reference in its entirety for all purposes.

TECHNICAL FIELD

The present disclosure relates generally to downhole communications in a wellbore. More particularly, the present disclosure relates to a system that provides downhole communications via a network-interface unit that includes remote diagnostics and related features.

BACKGROUND

In a well for hydrocarbon extraction, downhole signaling can be used to operate devices and to measure the structure and properties of a geological formation through which the wellbore traverses. A wellbore is a challenging environment, with temperatures that can approach 150 C.° (302 F°), 175 C.° (347 F°), or even 200 C.° (392 F°), and pressures that can approach 25 kpsi (172 MPa, or about 1700 atmospheres), or even 30 kpsi (207 MPa, or about 2000 atmospheres). Downhole communication systems that provide for communication flexibility without significant loss of precision in making downhole measurements are challenging to achieve in such an environment.

DETAILED DESCRIPTION

Certain aspects and features relate to managing a communication network in a downhole environment using remote diagnostics in a network-interface unit that is disposable in a wellbore. The network-interface unit may convert native format signals from downhole instruments to a power line communication signal to be transmitted to a surface instrument, controller, or computing device. Remote diagnostics of signal anomalies can be performed in the downhole environment, measurements can be reported to the surface, and control functions can be executed to segment the downhole network as needed to maintain network health and integrity. These capabilities can improve reliability by minimizing the occurrence of widespread failures that may otherwise interrupt wellbore operations.

A network-interface unit can include multiple interfaces for communicating between a surface controller and downhole devices. Since the network-interface unit can convert native format signals from downhole instruments to a signal to be transmitted uphole as well as convert signals from uphole back to native formats to transmit downhole, it can communicate with multiple different types of sensors, actuators, or other instruments within the same wellbore network, even on the same cable. The network-interface unit can also include a memory device and a signal capture module for acquiring and storing signal waveforms or values in the memory device. The network-interface unit can forward the stored information to the surface controller.

In some examples, processing devices can establish a communication link between a surface controller and a network-interface unit in a wellbore. A diagnostics command can be sent from the surface controller to the network-interface unit over a wellbore network. The network-interface unit can capture, in response to the diagnostics command, a diagnostic parameter for network health and integrity, such as a cable voltage at node or a current to node. As another example, the captured diagnostic parameter can be an oscilloscope type waveform of a cable signal or any other signal at the network-interface unit. The diagnostic parameters can be sent uphole and received by the surface controller and used for determining an anomalous condition in the downhole network.

The network-interface unit can optionally segment the downhole network for power control, current control, or to isolate failures in the downhole network. This network segmentation can take place automatically in response to determining the anomalous condition or can be directed by user input. The network-interface unit can include a switch or switching device to disconnect instruments (sensors or actuators) or network segments. Only the network-interface unit itself needs to be powered to allow control of connected equipment. Sections of the network being behind an inductive coupler will be disconnected by default as long as the inductive coupler is not active.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
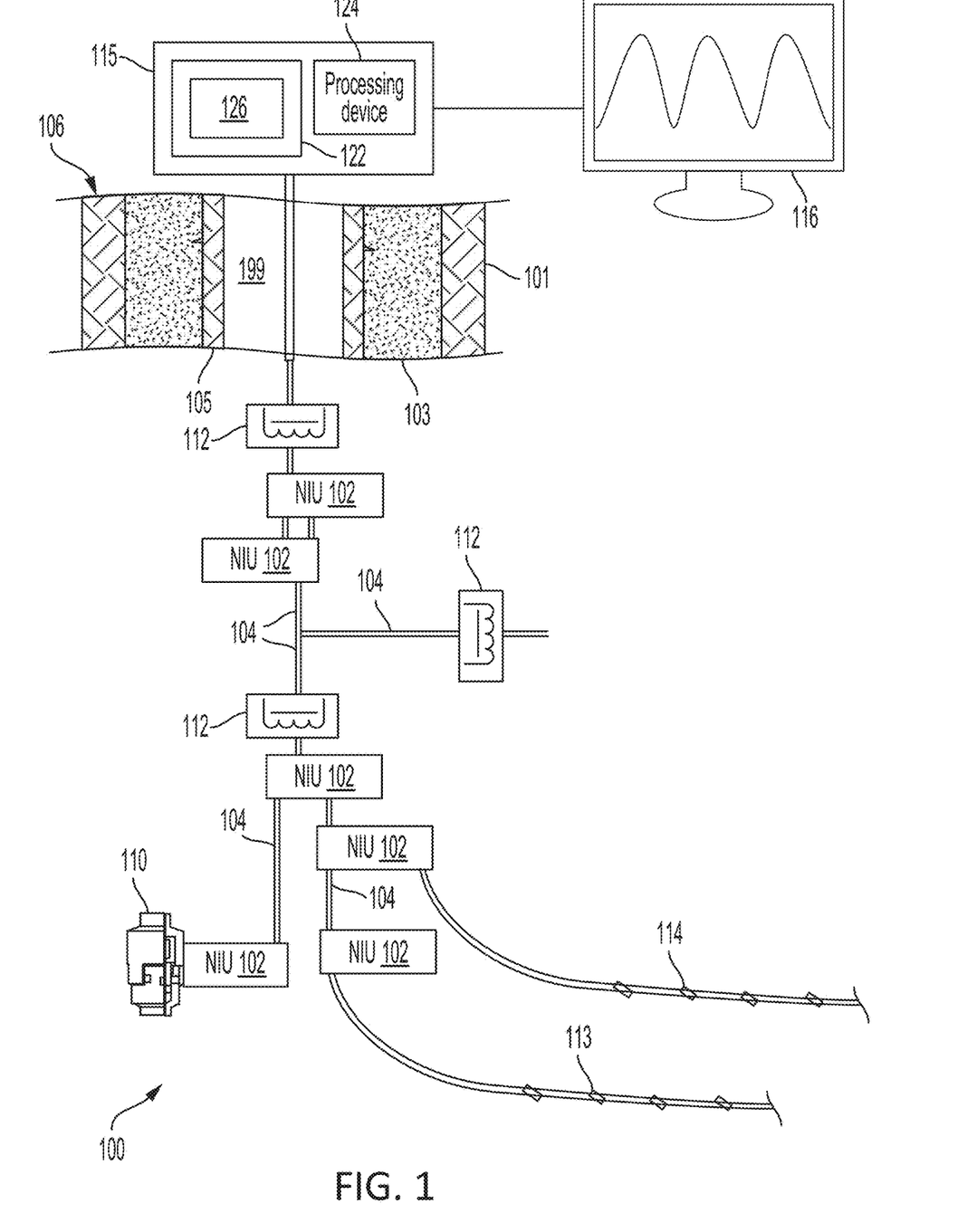
FIG. 1 is a schematic view of a well that includes a system for making measurements and controlling downhole devices in a wellbore according to some aspects of the disclosure.

FIG. 1 schematically illustrates an example of a well that includes a system 100 for networked communication in a wellbore according to some aspects. System 100 illustrates multiple alternative aspects of apparatus for networked downhole communication, however, these aspects can be implemented independently. In system 100, one or more cables 104 to the surface 106 provide electrical power and communication to a downhole sensor or actuator in a wellbore. In some examples, a cable 104 may be a tubing encapsulated cable (TEC) that connects to a network-interface unit (NIU) 102 downhole. In the example of FIG. 1, multiple NIUs form a network. For clarity, the internal architecture of an NIU is not shown in FIG. 1. A cable in this example does not need to physically pass through an NIU but can be attached to an NIU on each side with a connector. A cable 104 may connect to a surface controller 115, which in turn includes a memory device 122, a processing device 124, and computer program code instructions 126 for causing processing device 124 to communicate downhole with network-interface units 102. The communication can be used, as example, to activate diagnostics or signal capture routines in the network-interface units and direct the network-interface units to segment the downhole network. The processing device 124 can include one processing device or multiple processing devices. Non-limiting examples of the processing device 124 include a field-programmable gate array ("FPGA"), an application-specific integrated circuit ("ASIC"), a microprocessing device, etc.

The non-volatile memory device 122 may include any type of memory device that retains stored information when powered off. Non-limiting examples of the memory device 122 include electrically erasable and programmable read-only memory ("EEPROM"), flash memory, or any other type of non-volatile memory. In some examples, at least some of the memory device 122 can include a non-transitory computer-readable medium from which the processing device can read instructions. A computer-readable medium can include electronic, optical, magnetic, or other storage devices capable of providing computer-readable instructions or other program code. Non-limiting examples of a computer-readable medium include (but are not limited to) magnetic disk(s), memory chip(s), read-only memory (ROM), random-access memory ("RAM"), an ASIC, a configured processing device, optical storage, or any other medium from which a computer processing device can read instructions.

The NIUs 102 may connect to a variety of downhole devices via cable 104. NIUs 102 can also be included to provide redundancy and may not always be connected to downhole devices. For example, the top two NIUs in FIG. 1 can switch between cables in case of a cable failure. Examples of downhole devices in the network of FIG. 1 include valve actuator 110, inductive couplers 112, sensors 113 and sensors 114 for making measurements, for example, of pressure or temperature. Any number of NIUs 102 is configurable to connect to a cable 104. Input may be provided or information may be received through the input/output (I/O) device 116 connected to surface controller 115. In one or more embodiments, the I/O device is a touchscreen display. An I/O interface elsewhere with or in the surface controller 115 may also provide the necessary signaling for sending and receiving power line communication messages through cable 104. Surface controller 115 may be implemented, as examples, by a specialized computing device or by a controller card that is installed in general-purpose computing device.

In the particular configuration illustrated in FIG. 1, a casing 105 is cemented in place by cement 103 disposed between well casing 105 and a wall 101 of the wellbore 199. Tubing-side inductive couplers 112 are communicatively coupled to cable 104. Inductive couplers are used to extend the network wirelessly through some kind of barrier or for connecting units wirelessly when no electric connection is possible or feasible. Such connections may be useful for getting access to side-pockets, behind casing, between completion segments, to well laterals, through wellhead or whenever a wireless connection is wanted for improving reliability, give access to sites otherwise not accessible or when convenient for any other purpose. Throughout this disclosure, the terms coupled or connected can be used to refer to components that are actually coupled or connected together as well as components that are capable of being coupled or connected together but may be separated at times.

In some aspects, the NIUs 102 control the connections between the one or more cables 104, the valve actuator 110, downhole sensors 113 and 114, and downhole inductive couplers 112 that are below the NIUs. The NIUs 102 may additionally provide a capability to disconnect the downhole devices such as valve actuator 110 from the one or more cables 104 electrically in order to segment the network electrically. Such a disconnection may be desirable, for example, in order to isolate or segment parts of the downhole network from a malfunctioning device. An NIU can segment the network in response to a command sent from surface controller 115. Alternatively, the NIU can be programmed to not connect a part of the network in response to detecting an anomalous condition. In at least some examples, all isolation switches are normally off and each isolation switch is actively turned on either manually or automatically. Such an arrangement allows the system to start up even if there are faulty devices connected.

In other aspects, the surface controller 115 may send and receive power line communication messages over cables 104 to at least one NIU. The surface controller 115 may send and receive power line communication messages from an NIU 102 that can be coupled to the one or more cables 104. The NIU 102 may have multiple interfaces for communicating downhole using differing types of native downhole device signals for differing types of downhole sensors and actuators. In some cases, the NIU 102 may contain a processing unit that executes instructions or applications to cause the NIU to communicate between the downhole device and the surface controller 115 by converting an information format between any of the differing types of native signals and a power line communication message format for the surface controller signal. In some configurations, multiple NIUs 102 may be disposed along one or more cables 104 and coupled to various downhole devices, such as valve actuator 110, inductive couplers 112, sensors 113, or sensors 114. Any or all of these may be referred to herein as instruments or devices.

Sending power and communication signals through inductive couplers requires switching inductive coupler antenna current. As much as possible, the design for inductive coupler electronics to be used with an NIU should limit such current fluctuations to a minimum, allowing communication on a network even when inductive couplers are active. The NIU 102 can optimally control inductive coupler switchers to reduce noise levels in a complex downhole network structure where inductive couplers would otherwise induce noise on the one or more cables 104.

Figure 2:
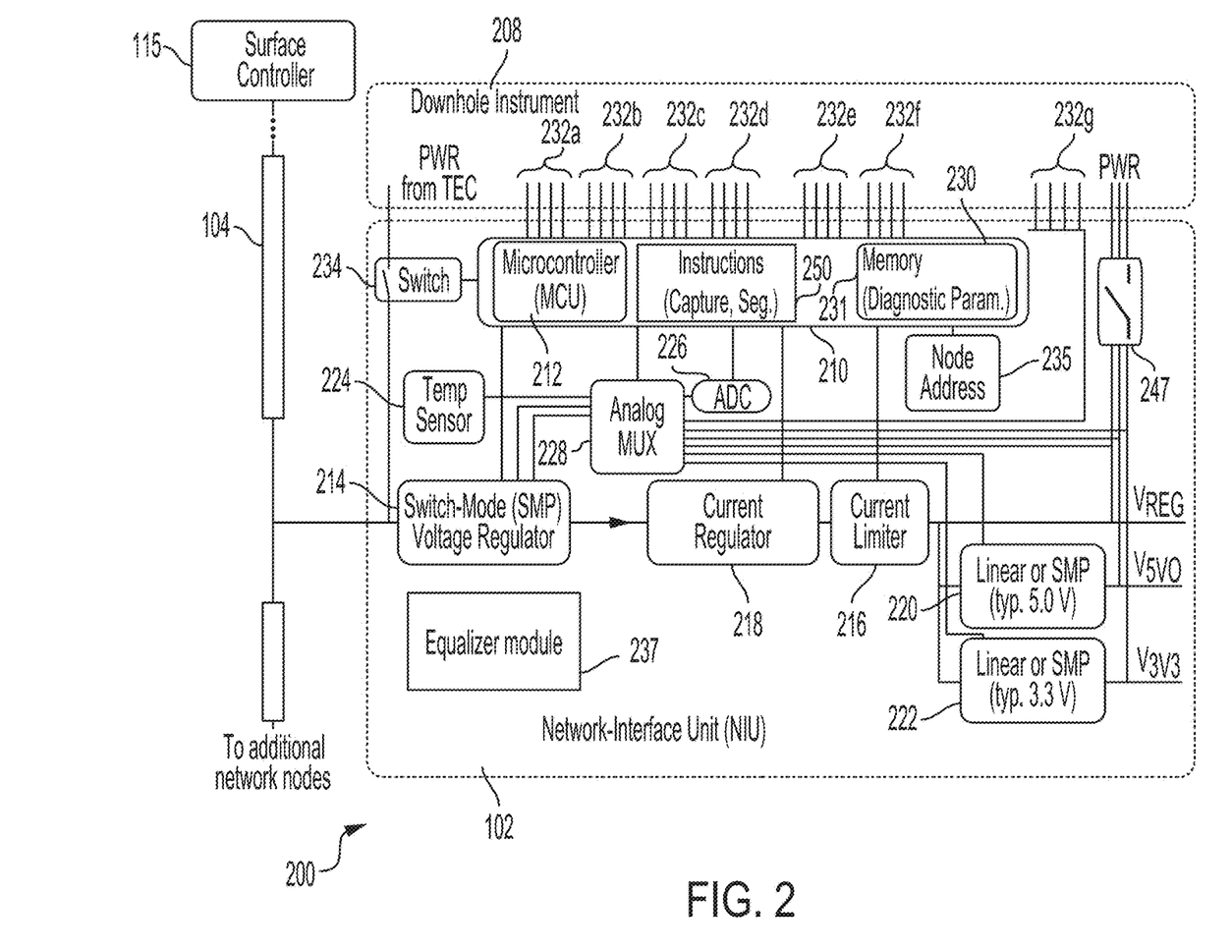
FIG. 2 is a block diagram of a downhole network-interface unit including diagnostics and network segmentation control according to some aspects of the disclosure.

FIG. 2 is a block diagram of an example of a downhole network communication system according to some aspects. The downhole network communication system 200 includes the surface controller 115 located the surface of the wellbore, either terrestrial or subsea, or on a drilling platform. The downhole network communication system 200 also includes the cable 104, an NIU 102, and a downhole instrument 208. Although only one cable, NIU, and downhole instrument is depicted in this example, it should be understand that more than one cable, NIU, and/or downhole instrument could be included in the downhole network communication system. The cable 104 may provide power (e.g., 100-300 VDC, or VAC) and communication from the controller 115 to the NIU 102. In some examples, a switch-mode voltage regulator 214 is part of NIU 102 and is couplable to the cable 104.

The NIU 102 may include various components or modules for sending and receiving messages by power line communication as well as providing voltage regulation to the downhole instrument 208. In one example, the NIU 102 includes a processing unit 210. The processing unit 210 can include a microcontroller (MCU) 212 as well as volatile and non-volatile memory device 230. Either the processing unit or the MCU can include a processing device or multiple processing devices. Non-limiting examples of the processing device include a field-programmable gate array ("FPGA"), an application-specific integrated circuit ("ASIC"), a microprocessing device, a microprocessor, a digital signal processor, etc.

The processing unit 210 also includes instructions 250, which are stored in non-transitory instruction memory or in the non-volatile (non-transitory) portion of memory device 230. The instructions are executable by the microcontroller to cause the microcontroller to carry out the communication, protocol conversion, diagnostic functions, network segmentation, and other functions of NIU 102. The diagnostic functions can be performed by a capture module portion of the instructions, which can capture voltage values, current values, or signal waveforms, any or all of which may be referred to herein as diagnostic parameters. An NIU can also be built with a hardware capture module or a capture module that combines hardware and software. The diagnostic parameters can correspond to the native signals or signals from the downhole cable connectable to the surface controller. A signal on the cable 104 extending from the NIU 102 to the surface controller 115 may be referred to herein as a surface controller signal. The diagnostic parameters 231 can be stored either temporarily or for long periods in memory device 230. The non-volatile memory within processing unit 210 may include any type of memory that retains stored information when powered off. Non-limiting examples include electrically erasable and programmable read-only memory ("EEPROM"), flash memory, a mask-programmable device, or any other type of non-volatile memory.

The switch-mode voltage regulator 214 is coupleable to the processing unit 210 and can provide power thereto via the cable. The NIU 102 includes a current limiter 216 and various other components such as current regulator 218, linear voltage regulators 220 and 222, temperature sensor 224, analog to digital converter 226, and an analog multiplexer 228. Switch 234 in some examples is a separate switch used in cases where an instrument requires more power than is accessible through the NIU voltage regulators 220. In some example the switch 234 can be part of the NIU 102. The NIU 102 may include power inputs (not shown) that may be connected to in-well power generation. The same voltage regulators can be used whether the power comes from the cable 104 or from a downhole power generator.

Switch-mode voltage regulator 214 may convert relatively high-voltage (100-300V) power from the cable to lower voltage power to supply to sensors and actuators. For some very high power applications, the NIU 102 unit may also allow the instrument to get direct access to the cable via switch 234 controlled by the NIU 102. By using this switch, the instrument may use higher power than available through the NIU 102 and still be behind the switch 234. The switch 234 acts as a network integrity barrier controlled by the NIU 102. An advantage of including a switch in the NIU is that the downhole instrument 208 can still be controlled by the NIU 102, even for an instrument where the NIU 102 cannot supply the power requirements of the downhole instrument 208. The switch 234 can be a transistor or other reliable switching element controlled by the NIU 102.

In some configurations, the NIU 102 has separate channels for communication on cable 104 or using a wireless protocol including an internal or external modem (not shown). The NIU 102 can communicate on wired and wireless protocols within a single network configuration. An NIU 102 may also be positionable as an input device for the secondary sides of inductive couplers of the network system and as an input device for driving the primary sides of inductive couplers. The NIU 102 may also protect itself from thermal issues by shutting down when the temperature sensor 224 detects a critically high temperature condition. An NIU can be designed to include multiple temperature sensors to monitor multiple critical components.

The NIU 102 may be couplable to the downhole instrument 208. An exemplary downhole instrument is an actuator or sensor that can be used to measure or perform various functions within a wellbore. The downhole instrument 208 may communicate in a variety of native formats, including analog, digital, or complex messaging formats. The NIU 102 has multiple communication channels to receive the different native formats from the downhole instrument 208. The NIU 102 converts the different native formats into a format that can be sent to the controller card using a power line communication format along the cable 104. In addition to analog and digital I/Os there may also be dedicated communication ports (such as serial links, I2C, SPI, etc.). Such communication ports are intended to carry messages according to a defined and standardized protocol.

In one example, the NIU 102 has multiple input/output interfaces. For instance, the inputs/outputs 232a-232g may provide various native signal formats. In one configuration, the inputs/outputs 232a may be a wireless communication port (e.g., wireless transmitter or receiver), inputs/outputs 232b may be an inductive coupler communication port (e.g., inductive coupler transmitter or receiver), inputs/outputs 232c may be an instrument communication port (e.g., a sensor or actuator transmitter and receiver), inputs/outputs 232d may be a combination of digital and analog channels (e.g., a digital input, digital output, analog input, or analog output). In some examples, inputs/outputs 232e, 232f, and 232g may be switchable voltage inputs or outputs that may include control lines for each of the switchable voltage inputs or outputs.

In another aspect, the NIU 102 provides electrical power to the downhole instrument 208. For example, controller 115 can send a message by power line communication to the NIU 102 to connect or disconnect electrical power from the downhole instrument 208. The NIU 102 may provide various levels of voltage from the voltage of the cable 104, to the voltage provided by the linear or switch-mode power (SMP) voltage regulators 220 and 222. The linear or SMP regulators may provide lower voltages to the downhole instrument 208. As depicted in the particular example of FIG. 2, the linear or SMP voltage regulators 220 and 222 provide variable voltages. In some examples, the voltages are 5 volts (V) or above. In other examples, these voltages are from 2 V to 12 V or 2 V to 20 V. 5.0 V and 3.3 V respectively, are examples of voltages that might be set to supply power to typical devices. Other combinations of voltages can be used. The power (PWR) lines are connected to the downhole instrument 208 through isolation switch 247, which can disconnect devices downhole to segment the downhole network. The isolation switch 247 can disconnect instruments for power control, current control, or to isolate failures in the downhole network. For purposes of this disclosure, such disconnection may be referred to as segmenting the downhole network. Segmentation can be activated automatically by the NIU or can be activated from the surface controller 115 either through user input or automatically. An isolation switch can also be included in other parts of the interface or other downhole lines such as signal lines. Multiple isolation switches can be included and can operate independently or together.

The NIU 102 may be operable at various bit rates. In some aspects, the NIU 102 may operate at an adaptable bit rate, operate using a configurable bit rate, or operate using a fixed bit rate. The NIU 102 may also function as a signal repeater. The surface controller 115 may add one or more additional node addresses to power line communication messages such that the first node addressed repeats the message and sends it to the next node in the list of addresses. This signal repeater function can be implemented by multiple network-interface units positioned along the cable 104 until the communication is received at the destination address. In other configurations, broadcast or multicast messages to groups of downhole devices are possible. NIU 102 in FIG. 3 includes its stored node address 235. Power line communication between surface controller 115 and an NIU 102 can be by either current or voltage modulation at data rates of, as an example, from 30 to 100 Kbits per second. NIU 102 may also include an equalizer module 237 to provide cable equalization by compensating for data transfer distortion.

Figure 3:
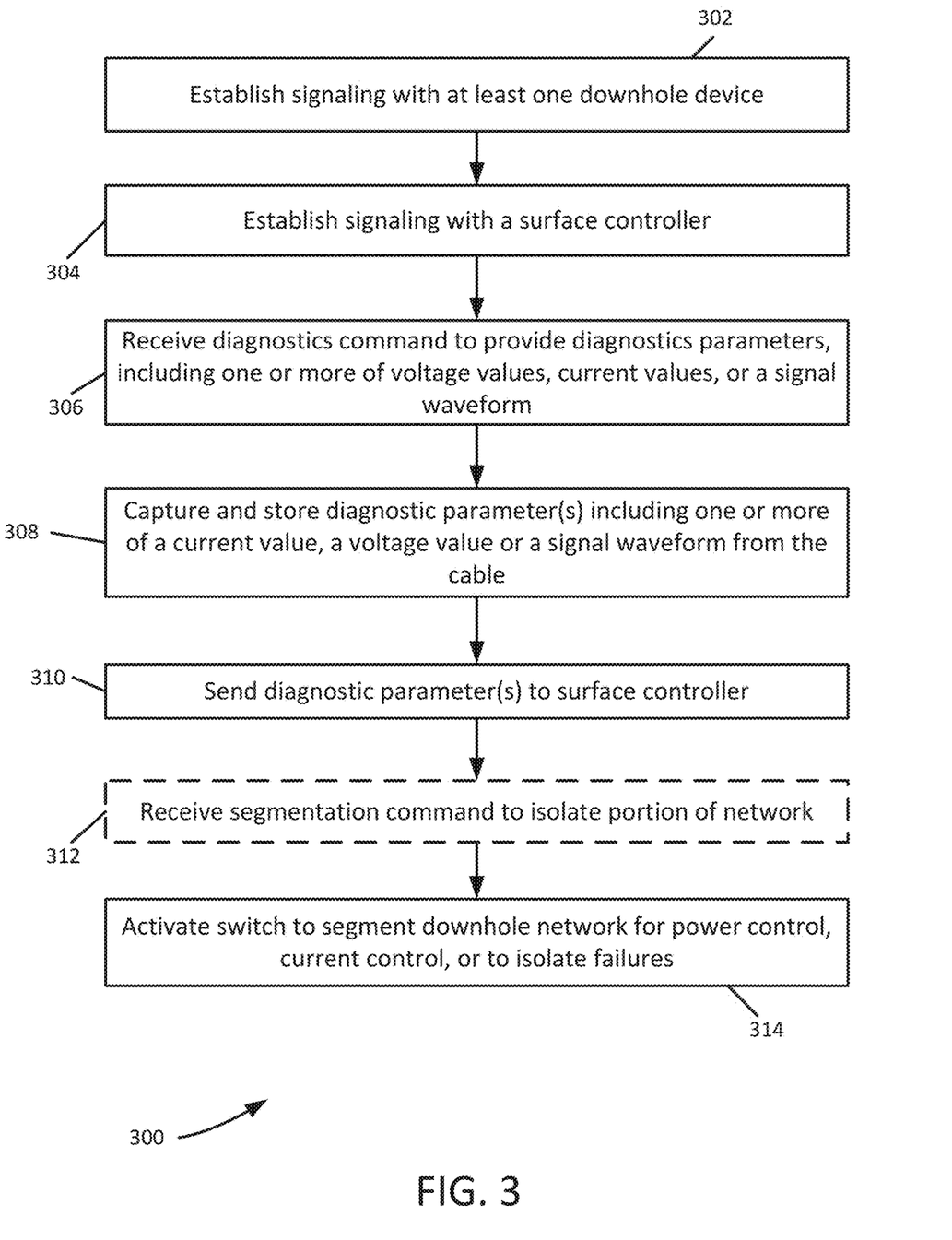
FIG. 3 depicts a process of performing downhole network diagnostics and segmentation according to some aspects of the disclosure.

FIG. 3 depicts a process 300 of using network diagnostics according to some aspects. Process 300 also includes network segmentation, which may be invoked, for example, in response to an anomaly detected in a signal waveform stored by the capture module. Such network segmentation can be directed automatically by the NIU 102 or directed from the surface controller, for example, by user input while reviewing diagnostic parameters. At block 302, the NIU 102 establishes a connection via processing unit 210 with at least one downhole device (such as valve actuator 110, inductive couplers 112, sensors 113, or sensors 114). In one or more embodiments, the NIU 102 establishes communication with multiple downhole devices via the signaling from the processing unit 210. The NIU 102 may establish communication using a handshake protocol or verification process provided by the respective downhole device to establish a communication link.

Continuing with FIG. 3, at block 304, the processing unit 210 establishes communication with the controller at the surface of the wellbore using power line communication. At block 306, the NIU 102 receives a diagnostics command. At block 308, the NIU 102 captures and stores at least one diagnostic parameter. Diagnostic parameters can include, as examples, voltage values, current values, power values, or signal waveforms from the cable 104. At block 310, the diagnostic parameter is sent to the surface controller 115. At block 312, the NIU 102 optionally receives a command to segment the downhole network. At block 314, the NIU 102 activates a switch to segment the downhole network for power control, current control, or to isolate failures. Network segmentation can be invoked by a received command or automatically by the NIU 102 in response to an analysis by the NIU 102 of diagnostic parameters captured and stored in memory device 230.

Diagnostic parameters may indicate an out of voltage or and out of current condition that requires voltage control or current control. A diagnostic parameter may also indicate a failure in the network requiring a portion of the network to be isolated from the rest of the network, referred to herein as segmenting the network. Any of these indications may be determined by analyzing individual voltage, power, or current values, or by performing signal analysis on the captured signal waveform.

Figure 4:
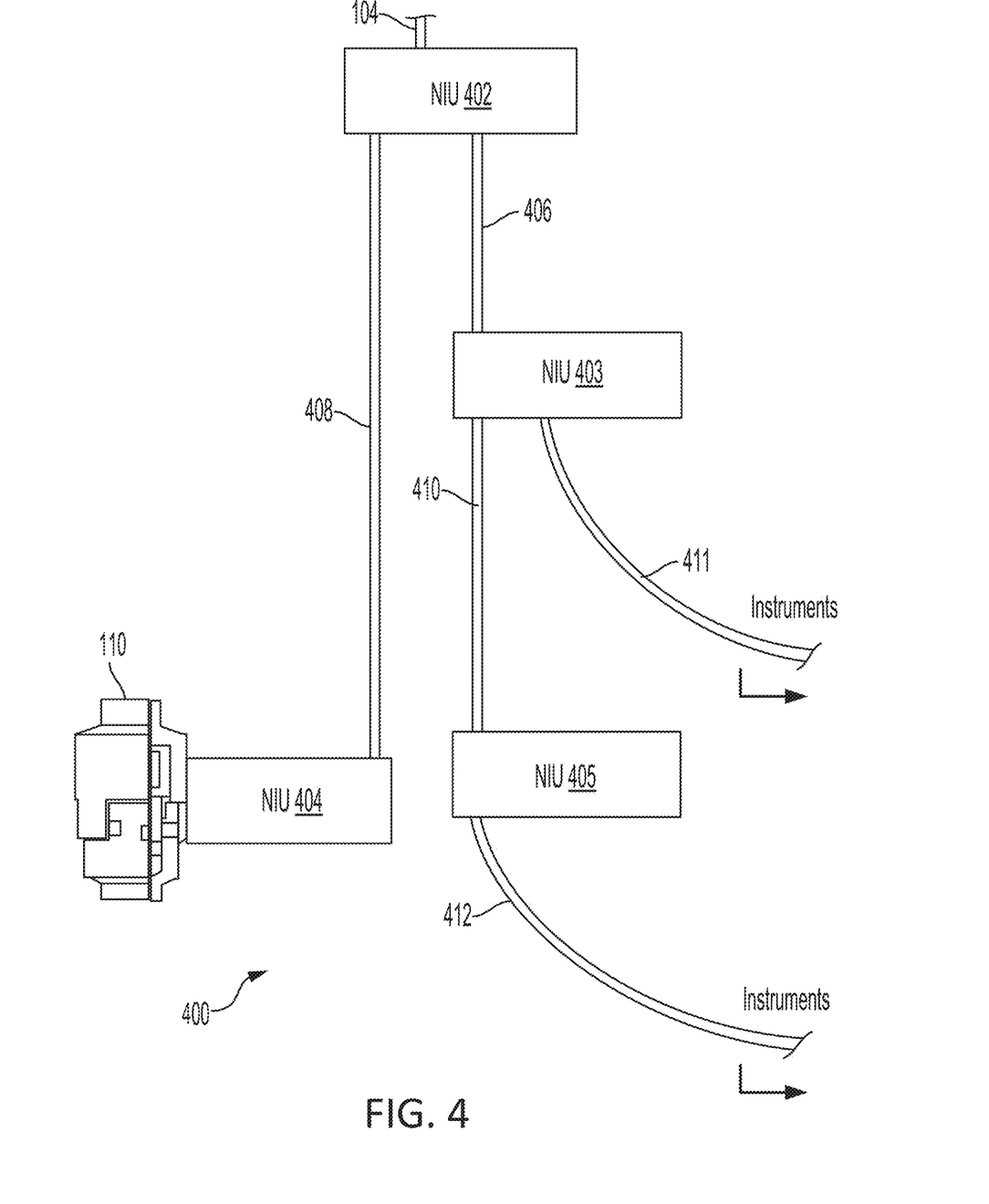
FIG. 4 depicts a portion of the system for network segmentation in a wellbore according to some aspects of the disclosure.

FIG. 4 depicts a system 400 for networked communication in a wellbore according to one or more examples. The system 400 could be a portion of the system 100 depicted in FIG. 1. In one aspect, the system 400 includes multiple NIUs. The NIUs may send and receive communication via power line communication along cables. For example, NIU 402 communicates over cable 104, cable 406, and cable 408. NIU 403 communicates over cable 406, cable 410, and cable 411. NIU 404 communicates over cable 408. NIU 405 communicates over cable 410 and cable 412. NIU 403 and NIU 405 are each connected to instruments (not shown) further downhole. Instruments may also be connected along any of the segments between NIUs. The arrangement of NIUs shown in the figures herein is an example. NIUs are connected to be able to segment various portions of the downhole network as may be needed depending on the instruments connected to each NIU along each segment.

One or more of the NIUs may provide network segmentation by disconnecting the power for a designated or unstable portion of the network. For instance, the downhole network may be segmented into portions based on the positioning of the NIU 402, which controls at least two segments, as cables 406, 410, and 412 may be treated a single segment. NIU 402 may switch the output between cable segments using individual isolation switches. However, if needed, each NIU may contain an isolation switch to disconnect instruments (sensors or actuators) or network segments. The controller at the surface can send commands to an NIU to disconnect electrical power from a segment of the downhole network or the NIU can automatically disconnect power as needed. Only the NIU itself needs to be powered to allow control of the connected equipment.

An NIU can be used to disconnect whatever is downhole from the NIU. NIUs that are connected through other NIUs such as NIUs 403-405 can be disconnected (power and signaling) if a first NIU downhole, such as NIU 402, disconnects the relevant portions of the network in order to segment the network. The second, third, or other disconnected NIUs downhole can be reactivated after their network segment is reactivated. Segmentation can be used to disconnect faulty sections of the network or sections that cannot be supported with power in periods when power is needed elsewhere in the network. For example, when a high-power instrument on a particular segment is needed, other network segments can be shut down in a controlled way while the high-power instrument is being used.

Figure 5:
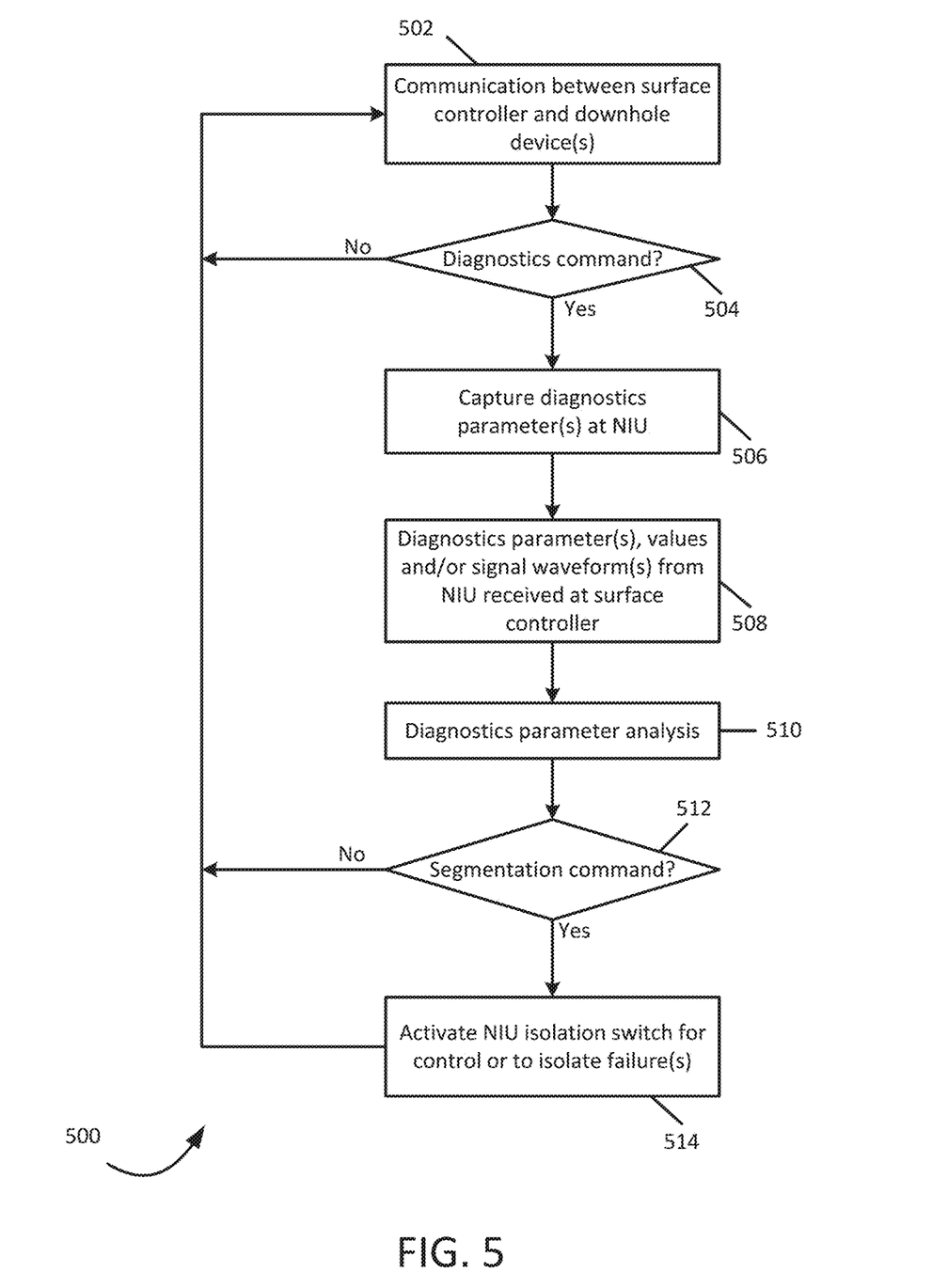
FIG. 5 depicts a process of managing diagnostics and network segmentation for downhole network control according to some aspects of the disclosure.

FIG. 5 depicts a process of managing diagnostics and network segmentation to provide downhole network control according to some aspects of the disclosure. At block 502 of process 500, communication signals are transferred between surface controller 115 and one or more NIUs as part of the normal operation of system 100. At block 504, a determination is made as to whether or when to send a diagnostics command from the surface controller to an NIU (e.g. NIU 102 or NIUs 402-405). This determination can be triggered, as examples, by the surface controller initiating diagnostics on a schedule, when requested by a user through user input, or when certain conditions are detected such as unusually high or low temperatures. These determinations can be NIU-specific. The surface controller 115 can issue a segmentation command to any NIU or multiple NIUs using NIU node addresses.

If the diagnostics command is sent at block 504, one or more diagnostic parameters are captured at the NIU(s) at block 506. At block 508, the captured diagnostic parameter is sent from the NIU(s) and received at surface controller 115. At block 510, the surface controller 115 analyzes the diagnostic parameters. The diagnostic parameters captured can also or alternatively be stored in a memory device such as memory device 122, forwarded over a surface network such as the Internet, or displayed locally to a user. The parameters can also trigger a message that is sent or presented to the user. At block 512, the surface controller 115 issues a segmentation command to the NIU(s). If such a command is issued, an isolation switch in the NIU(s) is activated at block 514. Otherwise, communication continues at block 502. If the isolation switch is activated, segments of the network that are behind an inductive coupler (e.g. inductive couplers 112) will be disconnected by default as long as the inductive coupler is not active (antenna system not powered).

In some aspects, a system for downhole network diagnostics and segmentation is provided according to one or more of the following examples. As used below, any reference to a series of examples is to be understood as a reference to each of those examples disjunctively (e.g., "Examples 1-4" is to be understood as "Examples 1, 2, 3, or 4").

Examples 1, 2, 3, Etc.

The foregoing description of the examples, including illustrated examples, has been presented only for the purpose of illustration and description and is not intended to be exhaustive or to limit the subject matter to the precise forms disclosed. Numerous modifications, combinations, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:

1. Apparatus comprising:
   a network-interface unit disposable in a wellbore, the network-interface unit further comprising:
      a plurality of interfaces for communicating between a surface controller and one or more downhole devices;
      a memory device; and
      a signal capture module for acquiring and storing in the memory device, a diagnostic parameter corresponding to at least one of a downhole device signal or a surface controller signal in a downhole network.

2. The apparatus of claim 1, wherein the plurality of interfaces comprises an inductive coupler communication port.

3. The apparatus of claim 1, wherein the network-interface unit further comprises a switch to segment the downhole network for power control, current control, or to isolate failures in the downhole network.

4. The apparatus of claim 3, further comprising at least a second network-interface unit connectable to the downhole network to be segmented in response to the switch.

5. The apparatus of claim 1, wherein the network-interface unit further comprises a processing device and instructions that are executable by the processing device for causing the processing device to detect an anomalous condition by analyzing the diagnostic parameter at the network-interface unit.

6. The apparatus of claim 1 further comprising a surface controller, the surface controller including a processor and a non-transitory computer-readable medium that includes instructions that are executable by the processor for causing processor to send a diagnostics command downhole, receive the diagnostic parameter, and at least one of display or store the diagnostic parameter.

7. The apparatus of claim 6, wherein the diagnostic parameter includes at least one of a voltage value, a current value, or a signal waveform.

8. The apparatus of claim 6, wherein the instructions are executable by the processor for causing processor to detect an anomalous condition by analyzing the diagnostic parameter at the surface controller.

9. A method comprising:
   establishing, by a processing device downhole, a communication link with a surface controller;
   receiving, by the processing device, a diagnostics command from the surface controller at a network-interface unit over a downhole network;
   capturing, by the processing device, at the network-interface unit in response to the diagnostics command, a diagnostic parameter corresponding to a signal at the network-interface unit; and
   transmitting, by the processing device, the diagnostic parameter from the network-interface unit to the surface controller.

10. The method of claim 9, further comprising:
    receiving the diagnostic parameter from the network-interface unit at the surface controller; and
    at least one of storing or displaying the diagnostic parameter.

11. The method of claim 10, wherein the diagnostic parameter comprises at least one of a voltage value, a current value, or a signal waveform.

12. The method of claim 11, further comprising detecting an anomalous condition at the surface controller by analyzing the diagnostic parameter.

13. The method of claim 12, further comprising sending a segmentation command from the surface controller to the network-interface unit in response to analyzing the signal waveform.

14. The method of claim 9 further comprising:
    analyzing the diagnostic parameter at the network-interface unit; and
    segmenting, by the network-interface unit, in response to analyzing the diagnostic parameter, the downhole network for power control, current control, or to isolate failures in the downhole network.

15. The method of claim 14, wherein segmenting the downhole network comprises disconnecting a portion of the downhole network behind an inductive coupler.

16. A non-transitory computer-readable medium that includes instructions that are executable by a processing device for causing the processing device to perform operations comprising:
    establishing signaling with a network-interface unit over a downhole network;
    sending a diagnostics command to the network-interface unit over the downhole network;
    receiving a diagnostic parameter from the network-interface unit in response to the diagnostics command, the diagnostic parameter corresponding to a signal at the network-interface unit; and
    storing the diagnostic parameter.

17. The non-transitory computer-readable medium of claim 16, wherein the diagnostic parameter comprises at least one of a voltage value, a current value, or a signal waveform.

18. The non-transitory computer-readable medium of claim 16, wherein the operations further comprise detecting an anomalous condition by analyzing the diagnostic parameter.

19. The non-transitory computer-readable medium of claim 16, wherein the operations further comprise displaying the diagnostic parameter.

20. The non-transitory computer-readable medium of claim 16, wherein the operations further comprise sending a segmentation command to the network-interface unit to cause the network-interface unit to segment the downhole network.

* * * * *